US012749894B1

(12) United States Patent
Celal et al.

(10) Patent No.: US 12,749,894 B1
(45) Date of Patent: Sep. 29, 2026

(54) DYNAMIC SYSTEM FOR EXCESS ENERGY DISTRIBUTION

(71) Applicant: Kraken Technologies Limited, London (GB)

(72) Inventors: Devrim Celal, London (GB); Anthony Philip Waite, Shetland (GB); Jacob Acher Varsano, New York, NY (US); Nicholas Good, Clitheroe (GB)

(73) Assignee: Kraken Technologies Limited, London (GB)

( * ) Notice: Subject to any disclaimer, the term of this patent is extended or adjusted under 35 U.S.C. 154(b) by 0 days.

(21) Appl. No.: 19/279,938

(22) Filed: Jul. 24, 2025

(51) Int. Cl.
*H02J 3/007* (2026.01)
*H02J 3/00* (2026.01)
*H02J 103/35* (2026.01)

(52) U.S. Cl.
CPC ............. *H02J 3/0075* (2020.01); *H02J 3/003* (2020.01); *H02J 3/004* (2020.01); *H02J 2103/35* (2026.01)

(58) Field of Classification Search
CPC .......... H02J 3/0075; H02J 3/003; H02J 3/004; H02J 2203/10; H02J 3/38; H02J 3/14; H02J 13/00; H02J 7/35; G06Q 30/60; G06Q 30/08; Y04S 10/12
See application file for complete search history.

(56) References Cited

U.S. PATENT DOCUMENTS 8,504,463 B2 * 8/2013 Johnson .................. H02J 3/008 705/37
2011/0231320 A1 * 9/2011 Irving .................... G06Q 30/08 713/300
2012/0278220 A1 * 11/2012 Chassin ................ G06Q 40/04 705/37
2014/0281645 A1 * 9/2014 Sen ......................... H02J 3/003 713/340

* cited by examiner

*Primary Examiner* — Menatoallah Youssef
*Assistant Examiner* — Aqeel H Bukhari
(74) *Attorney, Agent, or Firm* — Bochner PLLC; Andrew D. Bochner

(57) ABSTRACT

A system for distributing electrical energy within an electrical grid comprising: an electrical grid with one or more capacity constrained critical grid network elements having a maximum electrical energy load; a flex platform including a capacity assessment module monitoring electrical energy consumption at a first time relative to the maximum electrical energy load to determine a first excess quantity of electrical energy remaining, and an initial bid aggregation module; a first significant energy consumer having a first peak electrical energy demand and a second significant energy consumer having a second peak electrical energy demand, wherein a combination of the first and second peak electrical energy demands exceed the maximum electrical energy load; the first excess quantity of electrical energy is allocated, via the flex platform, to the first or second significant energy consumer in response to at least a first bid received by the initial bid aggregation module.

23 Claims, 5 Drawing Sheets

DYNAMIC SYSTEM FOR EXCESS ENERGY DISTRIBUTION

FIELD OF THE PRESENT DISCLOSURE

The present disclosure is directed to a dynamic system for excess energy distribution. More specifically, the present disclosure is directed to a dynamic system for assessing excess capacity at one or more critical network points and distributing said excess to one or more significant electrical energy consumers.

INTRODUCTION

The rapid growth of data center demand, driven by the proliferation of artificial intelligence (AI) and cryptocurrency mining operations, has placed unprecedented strain on power grids and network capacity. This surge in energy consumption coincides with a period of significant challenges for utility providers, who are grappling with constrained grids, rising system operation costs, volatile energy prices, and mounting delays in interconnection queues.

The landscape of power generation and distribution is undergoing substantial transformation. The increasing integration of intermittent renewable energy sources, coupled with the retirement of traditional dispatchable power plants, has led to significant shifts in load profiles. These changes are reshaping the grid in ways that were not anticipated by existing infrastructure and management systems.

Procuring capacity for new data center interconnections or supporting incremental load growth has become increasingly complex and expensive. Current capacity procurement methods often distribute associated costs across all customers within a service territory, regardless of their individual energy consumption patterns. This approach can lead to inequitable cost allocation and may not accurately reflect the localized impacts of large-scale energy consumers such as data centers.

Traditional fixed electricity tariffs have proven to be inefficient and costly in the context of modern energy demands. These tariff structures typically fail to account for the dynamic nature of energy consumption and production, particularly in relation to the siting and operation of data centers. As a result, they may not provide accurate price signals that reflect the true costs and benefits of energy consumption at different times and locations within the grid.

While data center loads have historically been relatively inflexible, modern computational workloads, such as those associated with AI training and cryptocurrency mining, offer new opportunities for dynamic load shaping. These workloads can potentially adjust their processing intensity and timing based on real-time energy prices or grid capacity signals. However, existing systems and market structures often lack the mechanisms to fully leverage this flexibility.

In many regulated markets, large commercial energy users, including data centers, have limited direct interaction with wholesale electricity markets or retail providers. Participation in these markets frequently requires complex bilateral contracts or bespoke tariff structures, which can be challenging to implement and scale. This disconnect between large energy consumers and market mechanisms hinders the efficient dispatch of generation resources, limits the integration of flexible and renewable energy sources, and can undermine overall grid stability. In light of these challenges, adding additional energy consumers to the market, particularly significant consumers (e.g., data centers, bitcoin miners, etc.), has become extraordinarily burdensome, and in some instances, impossible.

The cost of managing these inefficiencies is often passed on to ratepayers, leading to increased consumer bills. This situation raises equity concerns, particularly in light of the growing energy demands of large, energy-intensive users such as data centers. The lack of mechanisms for these users to directly respond to market signals or contribute to grid stability further exacerbates these issues.

Current demand response systems, while beneficial, often operate on relatively long timescales and may not fully capture the potential for real-time load adjustment offered by modern data center operations. These systems typically focus on reducing load during peak periods but may not provide the granularity or speed of response needed to address the rapid fluctuations in energy supply and demand characteristic of grids with high renewable penetration.

The integration of large-scale battery energy storage systems (BESS) and other flexible resources into grid operations presents both opportunities and challenges. While these technologies offer potential solutions for balancing supply and demand, existing market structures and control systems may not be optimized to fully utilize their capabilities in coordination with flexible loads such as data centers.

Furthermore, the increasing electrification of various sectors, including transportation (e.g., electric vehicle charging) and heating, as well as variable energy generation from renewable energy sources, has added additional layers of complexity to grid management. These additional loads, which have their own patterns of variability and flexibility, which further underscore the limitations of existing approaches to managing electric grid capacity. Thus, a need for more sophisticated approaches to energy distribution and demand management has arisen.

As will be seen in the embodiments described herein, the dynamic system for excess energy distribution provides innovative solutions enabling more dynamic and efficient management of energy resources. Such a system facilitates closer integration between large energy consumers, such as data centers, and grid operations, allowing for real-time adjustment of loads in response to grid conditions and market signals. Additionally, there is a requirement for more sophisticated pricing mechanisms that can accurately reflect the true costs and benefits of energy consumption and production at different times and locations within the grid.

Addressing these issues is not only a matter of operational efficiency but also has significant implications for grid reliability, renewable energy integration, and the overall sustainability of our energy systems. As the demand for data center services continues to grow, driven by advancements in AI, cloud computing, and other data-intensive technologies, the need for a system such as the one described herein has become increasingly imperative.

SUMMARY

This Summary is provided to introduce a selection of concepts in a simplified form that are further described below in the Detailed Description. This Summary is not intended to identify key features or essential features, nor is it intended to limit the scope of the claims included herewith.

Aspects of the present disclosure may be directed to a system for distributing electrical energy capacity at one or more capacity constrained critical grid network elements within an electrical grid to a first significant electrical energy consumer having a first peak demand and a second significant electrical energy consumer having a second peak demand wherein a combination of the first peak demand and the second peak demand exceeds an electrical energy capacity constraint of the one or more capacity constrained critical grid network elements.

The system may include an electrical grid comprised of one or more capacity constrained critical grid network elements having a maximum electrical energy load capacity. Moreover, the system may also include a flex platform having a capacity assessment module and an initial bid aggregation module. In an embodiment, the capacity assessment module may monitor electrical energy consumption at a first time relative to the maximum electrical energy load capacity of the one or more capacity constrained critical grid network elements to determine a first excess quantity of electrical energy remaining at the one or more capacity constrained critical grid network elements. The system may also include a first significant electrical energy consumer having a first peak electrical energy demand and a second significant electrical energy consumer having a second peak electrical energy demand, wherein a combination of the first peak electrical energy demand and the second peak electrical energy demand exceed the maximum electrical energy load capacity of the one or more capacity constrained critical grid network elements. Additionally, the first excess quantity of electrical energy may be allocated, via the flex platform, to the first significant electrical energy consumer or the second significant electrical energy consumer in response to at least a first bid received by the initial bid aggregation module.

According to other aspects of the present disclosure, the system may include one or more of the following features. The electrical grid may further comprise one or more power generators selectively configurable to allocate the first excess of quantity of electrical energy in response to a first set of dispatch instructions transmitted from the flex platform. The flex platform may further comprise a dispatch module communicatively coupled to the initial bid aggregation module that transmits the first set of dispatch instructions. The capacity assessment module may monitor electrical energy consumption at a second time relative to the maximum electrical energy load capacity of the one or more capacity constrained critical grid network elements. The capacity assessment module may determine a second excess quantity of electrical energy remaining at the one or more capacity constrained critical grid network elements based on a difference between the maximum electrical energy load capacity and the electrical energy consumption at the second time. The flex platform may further comprise an auction module communicatively coupled to the capacity assessment module and the dispatch module, wherein the second excess quantity of electrical energy is allocated, via the dispatch module, to the first significant electrical energy consumer or the second significant electrical energy consumer in response to at least a second bid received by the auction module. The one or more power generators may be selectively configurable to allocate the second excess of quantity of electrical energy in response to a second set of dispatch instructions transmitted from the dispatch module. The maximum electrical energy load capacity of the one or more capacity constrained grid elements may be fixed. The maximum electrical energy load capacity of the one or more capacity constrained grid elements may be based on an aggregated dataset. The aggregated dataset may comprise real-time readings collected by a plurality of sensors deployed at the one or more capacity constrained critical grid network elements, historical electrical energy consumption patterns of the first significant electrical energy consumer and the second significant electrical energy consumer, and weather forecasts.

According to another aspect of the present disclosure, a method may be provided for distributing electrical energy capacity at one or more capacity constrained critical grid network elements within an electrical grid to at least one of a first significant electrical energy consumer having a first peak demand and a second significant electrical energy consumer having a second peak demand wherein a combination of the first peak demand and the second peak demand exceeds an electrical energy capacity constraint of the one or more capacity constrained critical grid network elements. The method may include monitoring, via a capacity assessment module of a flex platform, electrical energy consumption at a first time relative to a maximum electrical energy load capacity of one or more capacity constrained critical grid network elements. The method may also include determining, via the capacity assessment module, a first excess quantity of electrical energy remaining at the one or more capacity constrained critical grid network elements. The method may additionally include receiving, via an initial bid aggregation module of the flex platform, at least a first bid from the first significant electrical energy consumer or the second significant electrical energy consumer. In an embodiment, the method may include allocating, via the flex platform, the first excess quantity of electrical energy to the first significant electrical energy consumer or the second significant electrical energy consumer in response to the at least first bid received by the initial bid aggregation module.

According to other aspects of the present disclosure, the method may include one or more of the following features. Allocating the first excess quantity of electrical energy may comprise transmitting, from the flex platform, a first set of dispatch instructions to one or more power generators, and allocating, via the one or more power generators, the first excess quantity of electrical energy in response to the first set of dispatch instructions. The method may further comprise transmitting, via a dispatch module communicatively coupled to the initial bid aggregation module, the first set of dispatch instructions. The method may further comprise monitoring, via the capacity assessment module, electrical energy consumption at a second time relative to the maximum electrical energy load capacity of the one or more capacity constrained critical grid network elements. The method may further comprise determining, via the capacity assessment module, a second excess quantity of electrical energy remaining at the one or more capacity constrained critical grid network elements based on a difference between the maximum electrical energy load capacity and the electrical energy consumption at the second time. The method may further comprise receiving, via an auction module of the flex platform, at least a second bid from the first significant electrical energy consumer or the second significant electrical energy consumer, and allocating, via the dispatch module, the second excess quantity of electrical energy to the first significant electrical energy consumer or the second significant electrical energy consumer in response to the at least second bid received by the auction module, wherein the auction module is communicatively coupled to the capacity assessment module and the dispatch module. Allocating the second excess quantity of electrical energy may comprise transmitting, from the dispatch module, a second set of dispatch instructions to the one or more power generators, and allocating, via the one or more power generators, the second excess quantity of electrical energy in response to the second set of dispatch instructions. The maximum electrical energy load capacity of the one or more capacity constrained grid elements may be fixed. The maximum electrical energy load capacity of the one or more capacity constrained grid elements may be based on an aggregated dataset. The aggregated dataset may comprise real-time readings collected by a plurality of sensors deployed at the one or more capacity constrained critical grid network elements, historical electrical energy consumption patterns of the first significant electrical energy consumer and the second significant electrical energy consumer, and weather forecasts.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Figure 1:
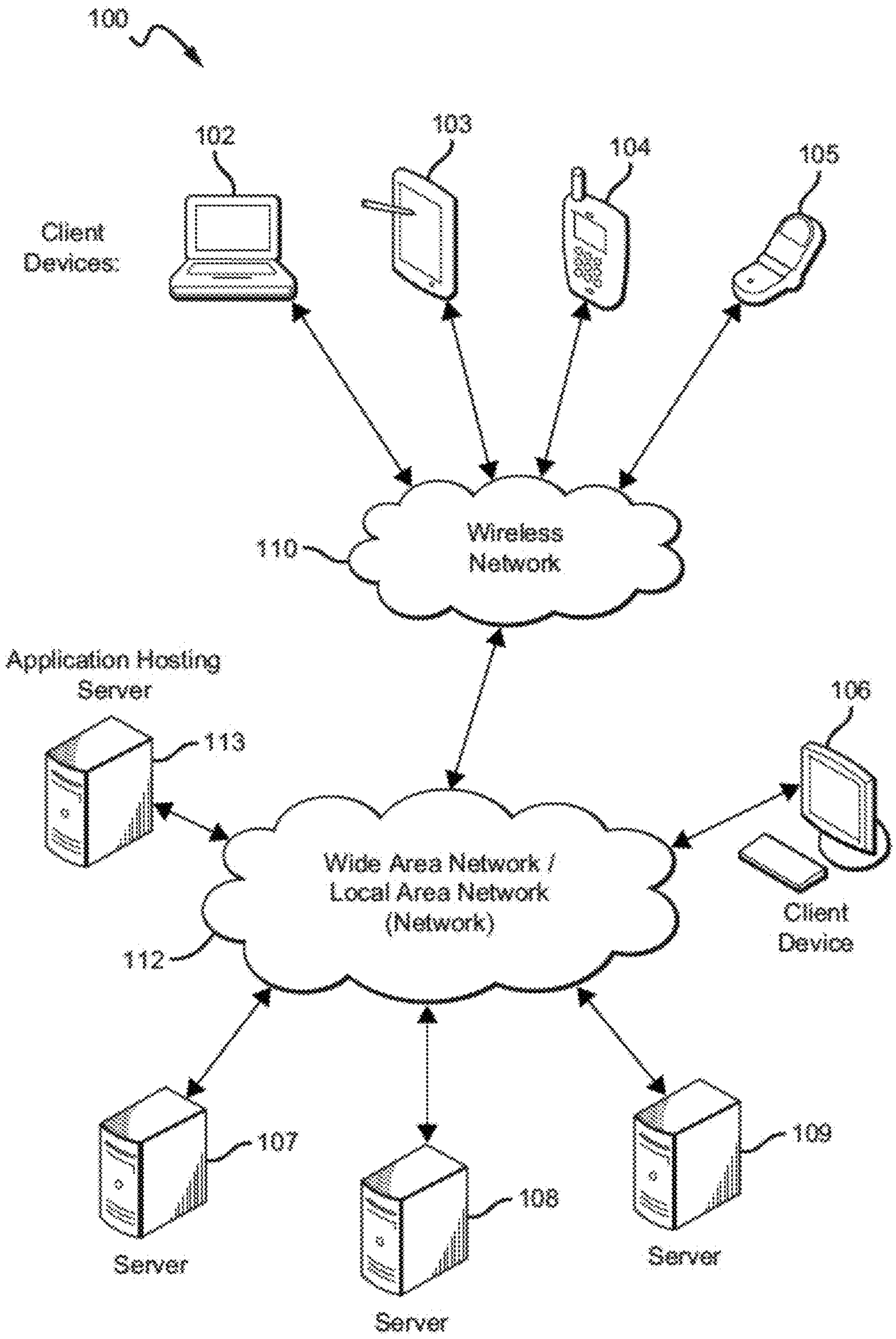
FIG. 1 illustrates an embodiment of an environment in which the systems and methods of the present disclosure may be practiced.

FIG. 1 illustrates components of one embodiment of an environment in which the present disclosure may be practiced. Not all of the components may be required to practice the present disclosure, and variations in the arrangement and type of the components may be made without departing from the spirit or scope of the present disclosure. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. The client devices 102-106 may include, for example, at least one of desktop computers, laptop computers, set top boxes, tablets, cell phones, smart phones, smart speakers, wearable devices (such as the Apple Watch) and the like. Servers 107-109 can include, for example, one or more application servers, content servers, search servers, and the like. FIG. 1 also illustrates application hosting server 113.

Figure 2:
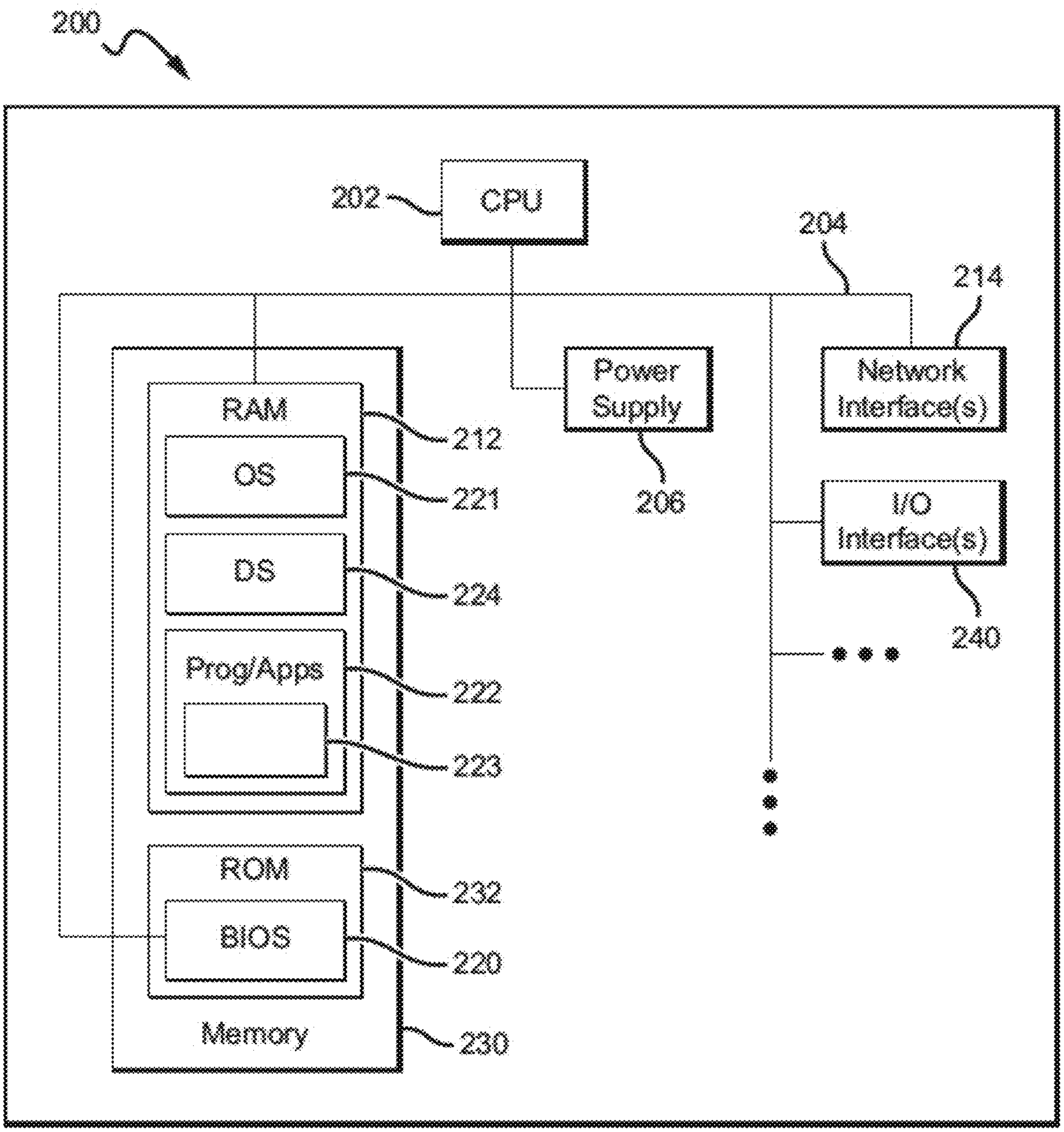
FIG. 2 illustrates an embodiment of a block diagram of an electronic device.

FIG. 2 illustrates a block diagram of an electronic device 200 that can implement one or more aspects of a system for excess energy distribution (the "Engine") according to one embodiment of the present disclosure. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software, and other tools necessary to implement or facilitate methods and systems according to embodiments of the present disclosure. The elements may exist on a single computer or be distributed among multiple computers, servers, devices, or entities.

The power supply 206 contains one or more power components and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example apparatus, system, and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone, or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows, iOS or Linux, and mobile operating systems such as iOS, Android, Windows Mobile, and the like.

Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPV6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Embodiments of the present disclosure may be implemented on the one or more of client devices 102-106, which are communicatively coupled to servers 107-109. Moreover, said client devices 102-106 may be communicatively coupled (i.e., wired or wirelessly) to one another via the one or more wireless networks 110 and/or the one or more LANs/WANs 112.

Figure 3:
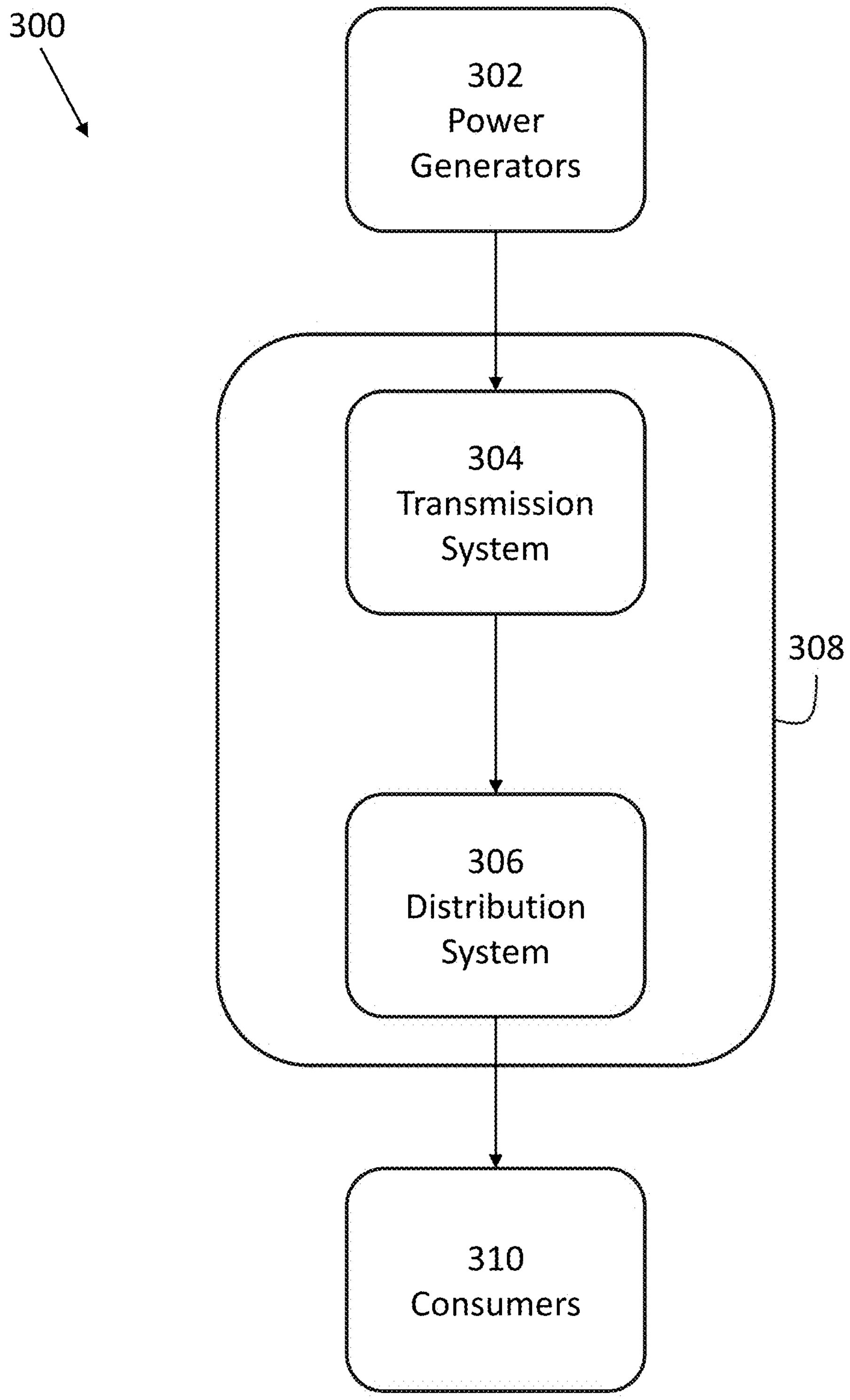
FIG. 3 illustrates an embodiment of a block diagram of an exemplary energy market.

Turning to FIG. 3, an exemplary embodiment of an electricity market (the "electricity market") 300 may be illustrated. Such a market 300 may be comprised of one or more components including, one or more power generators 302, a transmission system 304, a distribution system 306, one or more utilities 308, and/or a plurality of consumers 310. In some embodiments, the transmission system 304 and/or the distribution system 306 may be controlled by one or more utilities 308.

In an embodiment, the one or more power generators 302 may include power plants, renewable energy sources, and/or battery energy storage systems (BESS) producing electrical energy for an electrical grid. For instance, said power plants may include thermal power plants utilizing coal, natural gas, and/or nuclear reactions to produce electricity. Furthermore, the renewable energy sources may include hydroelectric dams, wind farms, and/or solar farms. In essence, the one or more power generators 302 convert one form of energy into electrical energy.

In another embodiment, the one or more power generators 302 may connect to an electrical grid via the transmission system 304. To explain, such a transmission system 304 may comprise step-up transformers and/or transmission power lines. For example, the electrical energy produced by the one or more power generators 302 may connect to the step-up transformers for increasing the voltage of the generated electricity. Increasing, or stepping up, the voltage is necessary for efficient long-distance transmission via the transmission power lines.

Furthermore, the transmission power lines may transmit the electrical energy from the step-up transformers to the distribution system 306. Specifically, the electrical energy may be transmitted to one or more electrical substations comprising the distribution system 306.

In some embodiments, the one or more substations comprising the distribution system 306 may be categorized into large substations and small substations. To illustrate, electrical energy transmitted from the step-up transformers to the distribution system 306 may first be received by the large substation where an initial voltage decrease occurs. The stepped down electrical energy may subsequently be transmitted to one or more smaller substations, wherein the voltage undergoes further reduction to be suitable for use by the plurality of consumers 310. The twice stepped down electrical energy is then distributed to the plurality of consumers 310 via one or more distribution power lines.

Figure 4:
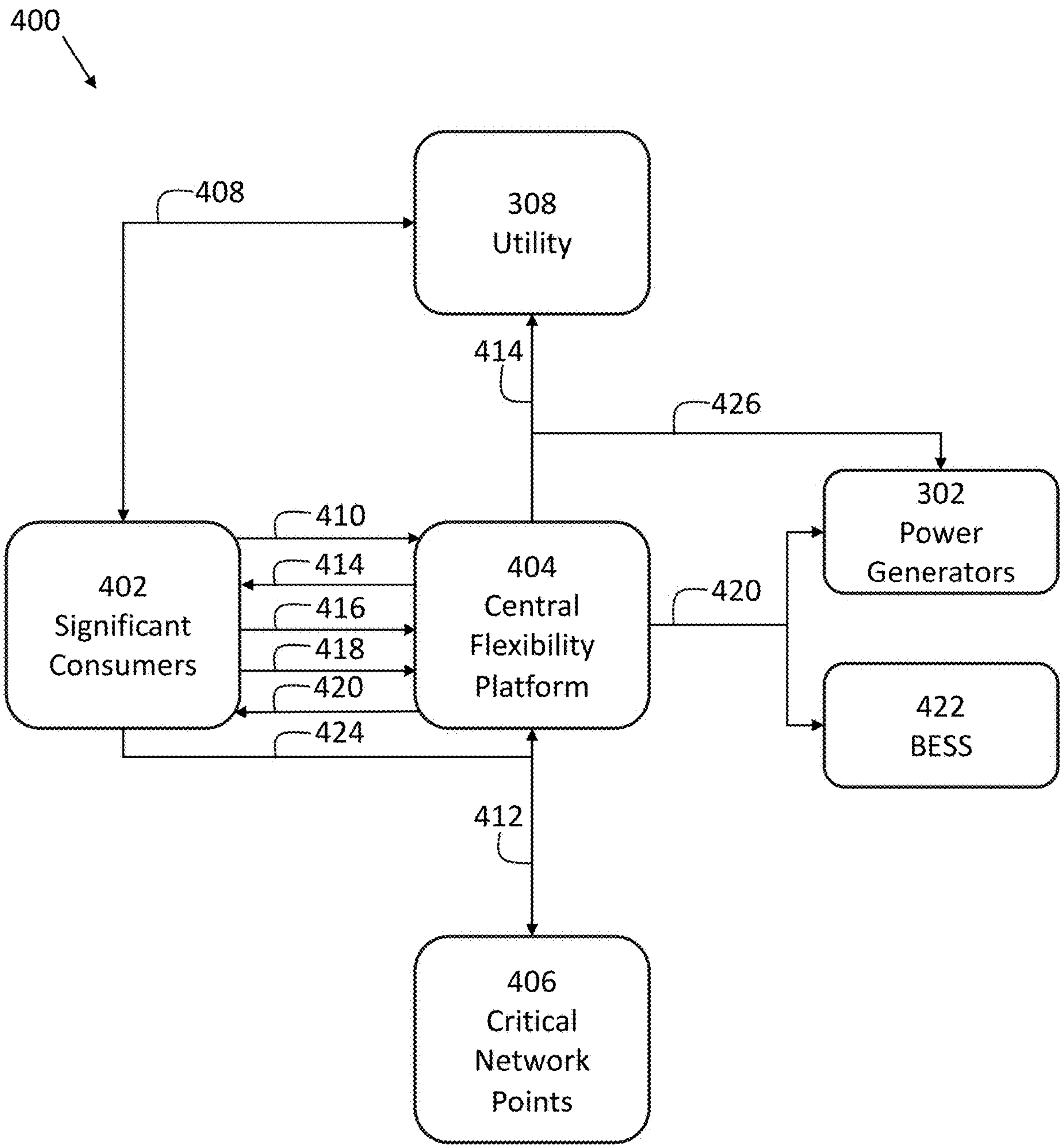
FIG. 4 illustrates an embodiment of a block diagram of a system for excess energy distribution.

Turning to FIG. 4, aspects of the present disclosure may relate to a dynamic system for excess energy distribution (the "system") 400. In an embodiment, the system 400 may provide a dynamic approach to electrical energy management. For instance, the system 400 may provide a framework for managing one or more significant energy consumers' (e.g., data centers, bitcoin mining operations, consumers exceeding 25 MW of energy consumption, etc.) 402 electrical energy consumption in coordination with utility providers 308 (the "utilities" or "utility"), power generators 302, the plurality of consumers 310, and the like.

Such a system 400 may facilitate dynamic allocation of capacity (i.e., the maximum power all power generators 302 in the market 300 can produce) and pricing by leveraging conditions of the electricity market 300 in real-time, as well as the needs of the one or more significant energy consumers (also referred to as "significant consumers") 402. Examples of the conditions monitored by the system 400 may include energy demand from consumers 310 across the electricity market 300, renewable energy availability, transmission congestion, and the like.

Moreover, the system 400 may enable the significant consumers 402 to access flexible electrical energy generation capacity derived from renewable energy sources, receive electrical energy load curtailment recommendations based on energy demand within the market 300, and additional capacity as needed. In particular, the system 400 may monitor one or more critical network points 406 (e.g., large substations, small substations, transformers, etc.) within the distribution system 306 to assess each network points' 406 capacity. By monitoring the capacity of the one or more critical network points 406, the system 400 facilitates improved electrical energy distribution enabling expansion of electrical energy consumption by the one or more significant consumers 402 at said network points 406.

In some embodiments, the significant consumers 402 may pay capacity fees to reserve additional capacity and/or flex fees when utilizing extra capacity. As a nonlimiting example, the significant consumers 402 may pay a daily capacity fee 410, which provides said consumers 402 with access to flexible electrical energy generation and/or electrical energy load management services. Such a daily capacity fee 410 may be procured in advance, enabling the significant consumers 402 to plan long-term.

In addition to the daily capacity fee 410, the system 400 may require flex fees 424 from the significant consumers 402 when accessing additional capacity. Thus, the flex fees 424 may serve as a usage-based fee levied when the significant consumers 402 utilize additional electrical energy. Such a flex fee 424 may reflect the real-time cost of providing additional electrical energy based on market 300 conditions.

Further, the system 400 may employ a bidding system, wherein the significant consumers 402 may submit one or more bids indicating a willingness to adjust electrical energy utilization based on the real-time conditions of the market 300. To illustrate, the bidding system may include a process employing algorithms interpreting factors such as electrical energy workload priority, real-time electrical energy prices, and operational constraints of the electricity market 300. With the bids, the significant consumers 402 may also submit an electrical energy load forecast.

Yet further, the system 400 may facilitate an alignment between the significant consumers 402 and the utilities 308. To explain, the utility 308 may perform a comprehensive capacity assessment. During such an assessment, the utility 308 may consider factors such as existing market 300 infrastructure, planned upgrades to the transmission system 304 and/or distribution system 306, and projected demand growth for electrical energy within the market 300.

Based on the initial assessment, the system 400 may establish an agreement (the "flex agreement" or the "agreement") 408 with the significant consumers 402 specifying the amount of excess capacity said consumers 402 may access, the excess capacity's usage conditions, and/or the price of accessing the excess capacity.

In an embodiment, the excess capacity is precisely quantified and explicitly incorporated into a rate tariff structure reflecting the flex agreement 408 with the significant consumers 402.

Such a rate tariff structure may include provisions for dynamic pricing corresponding to the utilization of excess, or flexible capacity, such as time-of-use rates, critical peak pricing, and/or real-time pricing structures.

Additionally, the system 400 may implement caps on total flexible capacity allocation or establish prioritization schemes for accessing said flexible capacity during high demand periods. Moreover, the agreement 408 may include provisions for ongoing monitoring of capacity utilization and periodic adjustments to the allocated headroom, involving regular reviews of actual usage patterns and adjustments to the rate tariff as needed.

The flex agreement 408 and associated tariff structures are designed to promote grid stability. As a nonlimiting example, said tariff structures may include incentives for significant consumers 402 to reduce electrical energy consumption during peak periods and/or increase consumption during periods of excess renewable generation. Such an approach considers long-term growth projections for both the significant consumers 402 and the broader market 300, ensuring that the flex agreements 408 remain viable and beneficial over extended periods. By accurately reflecting the available flexible capacity in the rate tariff, the system 400 helps prevent oversubscription of resources and creates a foundation for efficient, flexible, and sustainable energy management. That is, the system 400 optimizes resource allocation and reduces the risk of grid instability via overconsumption of electrical energy by the significant consumers 402.

Moving on, the system 400 may further comprise a central flexibility platform (the "flex platform") 404. Such a flex platform 404 may serve as the central hub of the system 400 to coordinate dynamic energy management between the utilities 308 and the one or more significant consumers 402.

The flex platform 404 may aggregate various conditions of the electricity market 300 to create flexible capacity, providing a buffer to accommodate fluctuations in electrical energy demand and supply. This aggregation process may involve collecting and analyzing real-time data from multiple sources within the electricity market 300, including power generators 302, transmission systems 304, distribution systems 306, utilities 308, and consumers 310.

The platform 404 may employ advanced data analytics and machine learning algorithms to process this information, identifying patterns and trends in energy production, consumption, and grid stability. By analyzing historical data alongside real-time inputs, the flex platform 404 may generate predictive models to anticipate potential fluctuations in energy demand and supply.

In some embodiments, the flex platform 404 may consider factors such as weather forecasts, scheduled maintenance of power generators 302, planned industrial activities, and historical usage patterns to refine its predictions. The platform 404 may also incorporate data from renewable energy sources, such as wind and solar farms, as well as electrical energy stored in BESS 422, to account for the inherent variability of these generation methods.

The creation of flexible capacity by the flex platform 404 may involve coordinating with various stakeholders in the electricity market 300. For instance, the platform 404 may negotiate with power generators 302 to maintain a certain level of reserve capacity that can be quickly ramped up or down as needed. Similarly, the flex platform 404 may work with the one or more significant consumers 402 (e.g., data centers, bitcoin mining operations, etc.) to implement demand response programs allowing for rapid adjustments in energy consumption based on market 300 conditions.

The buffer provided by this flexible capacity may serve multiple purposes within the electricity market 300. It may help maintain stability by quickly responding to sudden changes in energy demand or unexpected outages in power generation. Additionally, the buffer may enable more efficient integration of renewable energy sources by compensating for their intermittent nature.

The flexible capacity created by the flex platform 404 may also facilitate the implementation of dynamic pricing models. By accurately predicting supply and demand fluctuations, the platform 404 may enable more precise and responsive pricing structures that reflect real-time market 300 conditions.

Overall, the aggregation and flexible capacity creation capabilities of the flex platform 404 may significantly enhance the resilience, efficiency, and responsiveness of the electricity market 300, providing a robust mechanism for managing the complex interplay between energy production, distribution, and consumption.

The system 400 may operate through a series of interconnected processes enabling dynamic electric energy management and optimization. In an embodiment, a flex agreement 408 may be established between the one or more significant consumers 402 and the utility 308. Such a flex agreement 408 may secure excess capacity for the significant consumers 402 and detail a tariff structure the utility 308 will charge the significant consumers 402. This flex agreement 408 may serve as a foundational contract that governs the dynamic allocation of capacity and pricing within the system 400.

To illustrate, establishing the flex agreement 408 may begin with the utility 308 uploading its operational parameters (e.g., available excess capacity) to the flex platform 404. In one embodiment, the utility 308 may upload the parameters to the flex platform 404 a day ahead of its need. However, the parameters may be uploaded at any interval including, in real-time, every 30 minutes, etc. depending on specific implementations and/or market conditions. Subsequently, the flex platform 404 ingests the parameters from the utility 308 and displays them to the one or more significant consumers 402 for bidding upon a bidding interface 504 (described in more detail below) on the flex platform 404.

The flex agreement 408 may be customized based on the specific needs of the significant consumers 402 and the capabilities of the utility 308. For instance, it may include provisions for varying levels of excess capacity, ranging from a small percentage above baseline consumption to substantial increases during peak demand periods. The agreement 408 may also specify the conditions under which this excess capacity can be accessed, such as during specific time windows or in response to certain grid conditions.

In one embodiment, the flex agreement 408 may incorporate a tiered structure for excess capacity utilization. For example, the first tier may allow access to a certain amount of excess capacity at a predetermined rate, while subsequent tiers may offer additional capacity at progressively higher rates. This structure may incentivize efficient use of resources while still providing flexibility for unexpected demand spikes.

The tariff structure detailed in the flex agreement 408 may include various components to reflect the complexity of dynamic energy allocation. It may specify base rates for standard consumption, premium rates for excess capacity utilization, and potential rebates or credits for load reduction during critical periods. The tariff may also include time-of-use pricing elements, where rates fluctuate based on predetermined schedules to encourage load shifting to off-peak hours.

In some embodiments, the flex agreement 408 may include provisions for real-time pricing adjustments. This could involve a mechanism where the tariff rates are updated at regular intervals (e.g., hourly or every 15 minutes) based on current grid conditions, allowing for more precise alignment of pricing with actual energy costs and availability.

The agreement 408 may also outline the communication protocols and data sharing requirements between the significant consumers 402 and the utility 308. This may include specifications for real-time monitoring of energy consumption, forecasting of anticipated demand, and notification systems for capacity availability or grid stress events.

Upon the establishment of the flex agreement 408, the one or more significant consumers 402 may remit a daily capacity fee 410 to the flex platform 404 for securing on-demand access to the excess capacity. This daily capacity fee 410 serves as a reservation charge, ensuring that the significant consumers 402 have priority access to additional electrical energy when needed. The fee structure may be implemented in various ways to accommodate different market 300 conditions and needs of the plurality of consumers 310 and/or significant consumers 402.

In some embodiments, the daily capacity fee 410 may be structured as a flat daily rate. This approach provides simplicity and predictability for both the significant consumers 402 and the flex platform 404. The flat rate may be calculated based on historical data, projected demand, and the costs associated with maintaining excess capacity. This model may be particularly suitable for consumers 402 with relatively stable energy needs or in markets with consistent supply conditions.

In more dynamic implementations, the daily capacity fee 410 may utilize a pricing model that adjusts based on the market's 300 conditions. This approach may involve real-time or near-real-time adjustments to the fee based on factors such as overall grid demand, renewable energy availability, fuel costs, and transmission congestion. The flex platform 404 may employ advanced algorithms and machine learning techniques to analyze these factors and determine the appropriate fee. This dynamic model may provide the most accurate reflection of the true cost of maintaining excess capacity.

Furthermore, the flex platform 404 may incorporate monitoring capabilities to assess and forecast the maximum capacity of one or more critical network points 406 within the distribution system 306 in a monitoring process 412. This monitoring process 412 may involve a multi-faceted approach to data collection and analysis, leveraging various sources of information to create accurate and timely capacity forecasts.

In some embodiments, the flex platform 404 may utilize advanced sensor networks deployed at the critical network points 406 throughout the monitoring process 412. These sensors may measure real-time voltage levels, current flow, power factor, and other relevant electrical parameters. The data from these sensors may be transmitted from the critical network points 406 to the flex platform 404 using secure, low-latency communication protocols, enabling near-real-time monitoring of network conditions.

The forecasting algorithms employed by the flex platform 404 during the monitoring process 412 may incorporate machine learning techniques, such as neural networks or support vector machines, to identify complex patterns and relationships in the historical data. These algorithms may be continuously refined and updated as new data becomes available, improving their accuracy over time.

Weather predictions used in the forecasting process may include not only temperature and precipitation forecasts but also more specialized meteorological data such as solar irradiance predictions for photovoltaic systems and wind speed forecasts for wind farms. The flex platform 404 may integrate data from multiple weather services and models to enhance the reliability of its predictions.

Anticipated grid conditions considered by the flex platform 404 may encompass a wide range of factors. These may include scheduled maintenance activities on the transmission 304 or distribution 306 systems, planned outages of major power generators 302, expected changes in industrial production schedules, and anticipated shifts in behavior from the plurality of consumers 310 due to events or holidays.

In considering electrical energy derived from sources outside the power generators 302, the flex platform 404 may maintain a comprehensive database of BESS 422 connected to the distribution system 304. To illustrate, the flex platform 404 may track the state of charge, charging and discharging rates, and degradation patterns of individual battery installations and BESS 422. This detailed monitoring may allow for more accurate predictions of available energy from BESS 422 at any given time.

The flex platform 404 may also consider the potential for demand response actions in its capacity forecasts. By analyzing historical patterns of consumer behavior during demand response events and current enrollment in demand response programs, the platform 404 may estimate the amount of electrical energy load that can be reduced or shifted during peak periods.

In some implementations, the flex platform 404 may use probabilistic forecasting techniques to generate a range of possible capacity scenarios rather than a single point estimate. This approach may provide a more nuanced view of potential market 300 conditions and allow for better risk management in capacity allocation decisions.

The capacity forecasts generated by the flex platform 404 may be used for various purposes within the system 400. They may inform decisions about accepting or rejecting requests for additional capacity from significant consumers 402, guide the scheduling of maintenance activities, and support the development of strategies for managing potential capacity constraints.

By providing accurate and timely forecasts of capacity at critical network points 406, the flex platform 404 may enable more efficient utilization of existing infrastructure, potentially deferring or eliminating the need for costly network upgrades. As a nonlimiting example, the capacity at the critical network points 406 (e.g., substations, transformers, etc.) may be defined as the maximum power a particular point is able to transmit. To illustrate, if a single transformer is able to transmit up to 25 kW then its capacity is 25 kW. Such a capability may contribute significantly to the overall efficiency and reliability of the electricity market 300.

Upon determining the maximum capacity of the one or more critical network points 406, the flex platform 404 may subsequently transmit, via the one or more client devices 102-106 over the one or more wireless networks 110, said capacity to at least one of the utility 308 and the significant consumers 402 via a transmission process 414.

The transmission process 414 may occur at predetermined intervals, such as hourly or daily, or be triggered by specific events like sudden changes in market 300 conditions or capacity thresholds being reached. In some embodiments, the flex platform 404 may provide APIs that allow the utility 308 and significant consumers 402 to programmatically access capacity data during the transmission process 414. This may enable the development of custom applications and integrations tailored to the specific operational needs of the utilities 308 and significant consumers 402.

Upon receipt of the capacity of the one or more critical network points 406, the significant consumers 402 may transmit, via the one or more client devices 102-106 over the one or more wireless networks 110, present and/or forecasted electrical energy workload information in a forecasting process 416.

In some embodiments, the significant consumers 402 may transmit a forecast of the electrical energy workload for the following day during the forecasting process 416. This day-ahead forecast may be generated using predictive modeling techniques that incorporate historical usage data, planned operational activities, and external factors such as weather forecasts or anticipated market 300 conditions. The forecast may be updated multiple times throughout the day as new information becomes available, allowing for more accurate predictions.

The present and/or forecasted electrical energy workload information transmitted to the flex platform 404 during the forecasting process 416 may include detailed schedules of computational tasks and their priority levels. This granular level of detail allows for more efficient energy allocation and potential electrical energy load shifting. For instance, the schedule may categorize tasks into high-priority, time-sensitive operations that require immediate execution, and lower-priority tasks that can be deferred or rescheduled based on energy availability and pricing.

The workload information may also include the potential for shifting tasks in time or intensity. This flexibility allows the significant consumers 402 to adapt their energy consumption to grid conditions and pricing signals. For example, certain computational tasks might be accelerated during periods of low energy prices or high renewable energy availability, while others could be slowed down or postponed during peak demand periods.

By providing detailed and accurate workload information, the significant consumers 402 enable the flex platform 404 to optimize energy distribution, potentially leading to cost savings for the plurality of consumers 310 in addition to the significant consumers 402 and improved stability for the overall electrical grid.

In addition to transmitting the present and/or forecasted electrical energy workload, the significant consumers 402 may also transmit one or more bids to the flex platform 404 through a bidding process 418. Said bids may indicate the significant consumers 402 willingness to scale electrical energy workload up or down based on real-time price signals within the market 300. This bidding process 418 may involve sophisticated algorithms and decision-making systems designed to optimize energy consumption and cost efficiency.

The bids submitted by significant consumers 402 may take various forms, depending on the specific implementation of the system 400. In some embodiments, the bids may be structured as price-quantity pairs, where the consumer specifies the amount of load they are willing to increase or decrease at different price points. For example, a data center might offer to reduce its load by 10 MW if the price exceeds $100/MWh, or increase its load by 5 MW if the price falls below $20/MWh.

In more advanced implementations, the bids may include multiple parameters beyond just price and quantity. These could include factors such as ramp rates (how quickly the consumer can adjust their load), duration of load adjustment, and any constraints on consecutive load adjustments. For instance, a bid might specify that the significant consumers 402 can reduce load by 15 MW within 5 minutes, maintain this reduction for up to 2 hours, but cannot perform another load reduction for at least 1 hour afterwards.

The bidding process 418 may also incorporate different time horizons, allowing significant consumers 402 to submit bids for various timeframes. This could include real-time bids (for the next 5-15 minutes), short-term bids (for the next few hours), and day-ahead bids. Each of these bid types may have different characteristics and may be used by the flex platform 404 for different purposes in managing grid stability and efficiency.

To generate these bids, the significant consumers 402 may employ advanced energy management systems that continuously analyze their operational needs, energy consumption patterns, and the potential for load flexibility. These systems may use machine learning algorithms to predict the impact of load adjustments on operations and to optimize bid strategies based on historical performance and market conditions.

In some implementations, the bidding process 418 may include contingency bids that are only activated under specific grid conditions. For instance, a consumer might submit a bid to reduce load by a large amount, but only if the grid frequency drops below a certain threshold, indicating a potential stability issue.

The flex platform 404 may provide interfaces and APIs that allow significant consumers 402 to easily submit and manage their bids during the bidding process 418. These interfaces could include visualization tools to help significant consumers 402 understand the potential impact of their bids on their energy costs and operational efficiency.

The bidding process 418 may also incorporate mechanisms for bid validation and settlement. This could include automated checks to ensure that submitted bids are feasible based on the consumer's historical performance and current operational status. After a bid is accepted and acted upon, the system 400 may provide detailed settlement reports, showing how much load was actually adjusted and the corresponding financial impact.

By enabling significant consumers 402 to submit detailed, flexible bids, the system 400 creates a dynamic marketplace for demand-side energy management. This can lead to more efficient utilization of grid resources, improved integration of renewable energy sources, and potential cost savings for the plurality of consumers 310, significant consumers 402, and utilities 308.

Yet further, the flex platform 404 may aggregate a diverse array of data inputs to create a comprehensive view of the electricity market 300 and optimize energy distribution. This aggregation process may involve sophisticated data integration techniques and real-time analytics to synthesize information from multiple sources.

In aggregating real-time price signals within the market 300, the flex platform 404 may interface with various energy trading platforms, independent system operators (ISOs), and regional transmission organizations (RTOs). The platform 404 may also employ high-frequency data collection methods to capture price fluctuations at intervals as short as every five minutes or less. These price signals may be categorized by location, time of day, and energy type (e.g., baseload, peak, renewable) to provide granular insights into market dynamics.

For the capacity of critical network points 406, the flex platform 404 may utilize advanced network modeling techniques. These models may incorporate real-time sensor data, historical performance metrics, and predictive algorithms to assess the current capacity and forecast potential constraints. Further, the flex platform 404 may also consider factors such as thermal limits of transmission lines, voltage stability margins, and contingency scenarios in its capacity calculations.

In assessing the amount of electrical energy that may be produced by power generators 302, the flex platform 404 may integrate data from various generation sources. This may include real-time output data from conventional power plants, forecasted production from renewable sources based on weather predictions, and scheduled maintenance or outage information. The platform 404 may use machine learning algorithms to predict generation patterns and potential disruptions.

Electrical energy availability from BESS 422 may be evaluated using state-of-charge data, charging and discharging rates, and degradation models. The flex platform 404 may maintain a database of connected BESS 422 units, tracking their performance characteristics and operational constraints. This information may be used to optimize the dispatch of stored energy and to plan for future storage capacity needs.

In processing bids from significant consumers 402, the flex platform 404 may employ advanced auction algorithms. These algorithms may consider not only the price and quantity of each bid but also factors such as the consumer's historical reliability in meeting bid commitments and the potential grid impact of accepting specific bids. Furthermore, the flex platform 404 may use natural language processing techniques to extract relevant information from unstructured data sources and integrate it into its decision-making processes.

The aggregated data may be used to create a dynamic, multi-dimensional model of the electricity market 300. This model may be continuously updated and refined, providing a near-real-time representation of the entire energy ecosystem. The flex platform 404 may use this model to run simulations, predict future scenarios, and optimize resource allocation across the network.

By aggregating and analyzing this diverse set of data inputs, the flex platform 404 can make informed decisions about energy distribution, pricing, and grid management. This comprehensive approach may enable more efficient utilization of resources, improved integration of renewable energy sources, and enhanced grid stability, ultimately benefiting both energy providers (e.g., the power generators 302, the utility 308, etc.) and the one or more significant consumers 402.

Based on its analysis, the flex platform 404 issues dispatch instructions 420 to the power generators 302 to coordinate their actions to maintain grid stability and meet demand. These dispatch instructions 420 may be generated using algorithms that consider multiple factors simultaneously, such as current grid conditions, forecasted demand, renewable energy availability, and transmission constraints. The flex platform 404 may employ model predictive control techniques to anticipate future grid states and proactively adjust generation patterns.

In some embodiments, the dispatch instructions 420 may include not only power output levels but also specific operational parameters such as ramp rates, reactive power support, and frequency response capabilities. The system 400 may also incorporate feedback mechanisms, allowing power generators 302 to report their actual output and any deviations from the dispatch instructions 420 in real-time.

In response to the dispatch instructions 420, the one or more significant consumers 402 may adjust their electrical energy consumption. In one embodiment, the one or more significant consumers 402 may increase their electrical energy consumption when real-time market prices for electrical energy are low, or when renewable energy availability is high. This could involve accelerating energy-intensive computational tasks, charging on-site energy storage systems, or activating discretionary loads.

Contrarily, the one or more significant consumers 402 may decrease their electrical energy consumption when electrical energy consumption within the market is high and/or when real-time market prices for electrical energy are high. This reduction may be achieved through various means, such as temporarily suspending non-critical operations, shifting workloads to alternative locations with lower energy prices, or activating on-site generation resources. The significant consumers 402 may employ machine learning algorithms to optimize these load-shifting strategies, balancing operational requirements with energy cost considerations.

Furthermore, the power generators 302 may increase or decrease their electrical energy production in response to the dispatch instructions 420. For instance, to accommodate increased electrical energy consumption by the one or more significant consumers 402, the power generators 302 may receive dispatch instructions 420 to correspondingly increase electrical energy production. This may involve ramping up output from flexible generation sources such as natural gas plants or activating peaker plants during periods of high demand.

The flex platform 404 may coordinate the dispatch of various types of power generators 302, including baseload plants, intermediate load plants, and peaking plants, to create an optimal generation mix that balances cost, reliability, and environmental considerations. In some cases, the platform 404 may also manage the dispatch of renewable energy sources, curtailing output when necessary to maintain grid stability or increasing production when demand and grid conditions allow.

Likewise, when the one or more significant consumers 402 require increased capacity, the flex platform 404 may transmit dispatch instructions 420 to BESS 422 to discharge electrical energy. The management of BESS 422 may involve sophisticated charge/discharge algorithms that consider factors such as battery state of charge, degradation rates, and forecasted energy prices to optimize the utilization of stored energy.

Upon exercising its right to increase and/or decrease its electrical energy consumption, the one or more significant consumers 402 may remit a flex fee 424 per megawatt-hour of electrical energy consumed to the flex platform 404. This flex fee 424 structure may be designed to reflect the real-time value of flexibility in the electricity market 300. Furthermore, the flex fee 424 may be calculated using dynamic pricing models that consider factors such as the magnitude of the load adjustment, the speed of response, and the overall impact on grid stability.

Such a flex fee 424 reflects the real-time market price signals for electrical energy, in addition to the one or more significant consumers 402 participation in the system 400. The fee structure may include tiered pricing based on the level of flexibility provided, with higher fees for more responsive or larger-scale adjustments. In some embodiments, the flex fee 424 may also incorporate locational factors, reflecting the value of load flexibility in specific grid areas.

Additionally, the one or more significant consumers 402 may be required to remit a fuel fee. This fuel fee may be designed to cover the variable costs associated with generation, particularly for thermal power plants. The fuel fee may be calculated based on real-time fuel prices, generation efficiency factors, and the specific mix of generation sources used to meet the consumer's demand.

The flex platform 404 then remits payment via a settlement process 426 to the appropriate parties. This settlement process 426 may allocate costs and revenues among various stakeholders, including power generators 302, transmission system 304 operators, utilities 308, and the significant consumers 402. Additionally, the platform 404 may employ blockchain technology to ensure transparent and auditable financial transactions.

In some embodiments, the system 400 may also incorporate incentive mechanisms to encourage participation and improve overall system 400 efficiency. This could include performance-based bonuses for significant consumers 402 who consistently provide reliable load flexibility, or penalties for failing to meet committed adjustments. The flex platform 404 may continuously analyze the effectiveness of these incentive structures and adjust them to optimize system performance and fairness.

Figure 5:
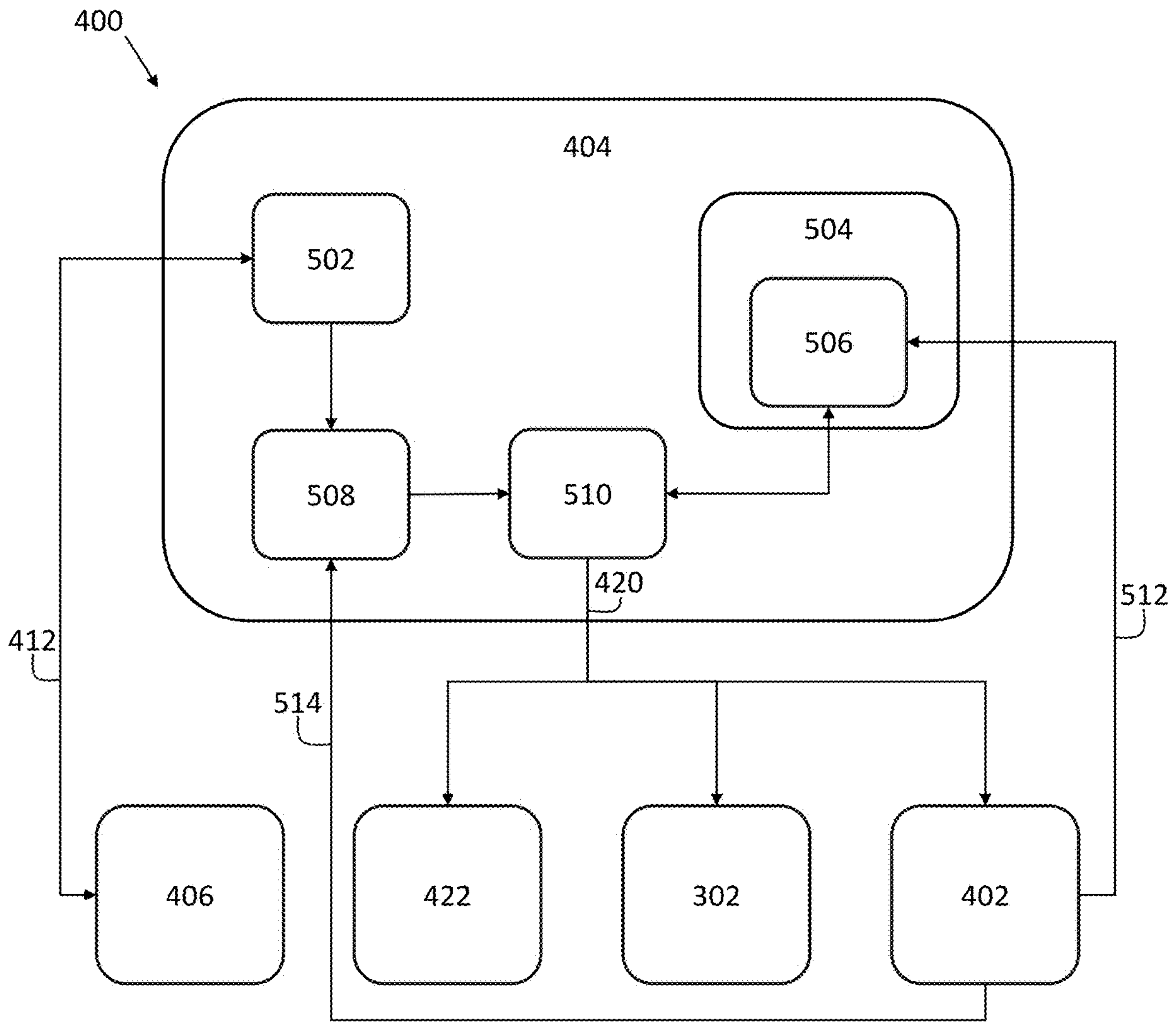
FIG. 5 illustrates an embodiment of a block diagram of the system for excess energy distribution.

Turning to FIG. 5, as previously mentioned, the system 400 comprises a flex platform 404, wherein said platform 404 may be configured to determine capacity of one or more critical network points 406 within a distribution system 306 of an electrical market 300.

In an embodiment, the flex platform 404 may include a capacity assessment module 502 that carries out the monitoring process 412. In a further embodiment, the capacity assessment module 502 may aggregate available data from multiple sources to accurately determine the capacity at each of the one or more critical network points 406. These data sources may include, real-time sensor readings, wherein the module 502 may interface with a network of sensors deployed at the one or more critical network points 406, collecting data on voltage levels, current flow, power factor, and other electrical parameters. These sensors may subsequently transmit data at high frequencies, potentially every few seconds or minutes, to ensure up-to-date information.

Furthermore, the capacity assessment module 502 may leverage historical electrical energy usage patterns of the plurality of consumers 310 and/or the one or more significant consumers 402 to identify trends, cyclical patterns, and anomalies that can inform capacity predictions; and weather forecasts to predict the output of renewable energy sources and anticipating changes in energy demand; and scheduled maintenance activities.

The outputs of the capacity assessment module 502 may be used by other components of the flex platform 404, such as the bidding interface 504 and the dynamic auction module 508, to inform capacity allocation decisions and pricing strategies. By providing accurate and timely assessments of available capacity at the one or more critical network points 406, the module 502 facilitates efficient and reliable operation of the energy distribution system 400.

Additionally, the system 400 further comprises a bidding interface 504 through which one or more significant consumers 402, typically data centers but potentially other large energy consumers (e.g., bitcoin miners), can submit day-ahead forecasts and bids for excess capacity during both the forecasting process 416 and the bidding process 418. The bidding interface 504 may be implemented as a secure web portal or API, allowing said consumers 402 to input their forecasted energy consumption needs during the forecasting process 416 and corresponding bids for incremental excess capacity during the bidding process 418.

Prior to the bidding process 418, the flex platform 404 may incorporate flexible capacity resources that were previously verified by the utility 308. In one example, the flexible capacity resources may include all of the power generators 302 within the market 300. Further, the flexible capacity resources may submit offers to the flex platform 404 specifying the quantity of capacity available (e.g., total MW available), the price per quantity consumed (e.g., $/MWh), and/or the time period for which the flexible capacity is accessible.

The bidding process 418 may comprise two distinct stages, each designed to optimize capacity allocation and grid efficiency. In the first stage 512, an initial bid aggregation module 506 within the bidding interface 504 collects and processes bids from the one or more significant consumers 402 for incremental excess capacity. In an embodiment, the incremental excess capacity may be comprised of unused capacity at a specific time within any given day. Meaning, the one or more large consumers 402 may bid upon the unused capacity at a specific time at any given period of time. As a nonlimiting example, these bids are based on day-ahead forecasted projections, allowing for advanced planning and resource allocation.

Furthermore, the one or more bids from the large consumers 402 may include the desired quantity of incremental excess capacity, the price per quantity consumed, and/or the time period for which the flexible capacity is accessible.

To illustrate, if on a particular day, a data center anticipates higher than usual computational demands, said data center may submit a bid to the bidding interface 504 for incremental excess capacity to meet their increased need. The bid may include the amount of excess capacity needed by the data center (e.g., 10 MW), the price they are willing to pay for the excess capacity (e.g., $75/MWh), and the time period in which they require the excess capacity (e.g., 1:00 PM to 1:30 PM).

In some embodiments, the time period for which the one or more significant consumers 402 require excess capacity may be sub-hourly. As a nonlimiting, if the data center above requires excess capacity from 1:00 PM to 5:00 PM, said data center may submit bids for excess capacity between the time slots of 1:00 PM to 1:30 PM, 1:30 PM to 2:00 PM, 2:00 PM to 2:30 PM, etc. In other embodiments, the time period may be hourly, or any suitable alternative increment of time.

Other significant consumers 402 may simultaneously submit bids for the same excess capacity. The flex platform 404 may compile the bids from the data center and the other significant consumers 402, via the bidding interface 504, and determine the optimal allocation of capacity. To illustrate, in embodiments where all of the excess capacity has not been filled, all bids will be accepted. However, in scenarios where all of the excess capacity has been filled, only the highest bids will be accepted.

The real-time, market 300 based approach allows the one or more significant consumers 402 to dynamically adjust their energy consumption based on operational needs and willingness to pay, while the flex platform 404 ensures efficient allocation of the excess capacity.

Upon transmission of the forecasts and bids from the one or more significant consumers 402, the bidding interface 504 may receive this information through secure communication channels. The initial bid aggregation module 506 may then process and organize the received data, creating a comprehensive view of the anticipated demand for excess capacity.

The initial bid aggregation module 506 may employ various optimization techniques to allocate the additional capacity effectively. These techniques may include advanced machine learning algorithms such as reinforcement learning able to consider multiple factors simultaneously, including, but not limited to, bid prices offered by significant consumers 402; historical reliability and performance of each of the one or more significant consumers 402; grid stability requirements and constraints; current and projected network capacity at the one or more critical points 406; forecasted renewable energy generation; and potential impact on other consumers 310 within the market 300.

The bidding interface 504 may provide real-time feedback to significant consumers 402 during the bidding process, allowing them to adjust their bids based on current market conditions and their relative standing in the first stage 512. This feedback loop can promote more efficient market behavior and help consumers optimize their energy procurement strategies.

In some embodiments, the initial bid aggregation module 506 may also consider long-term contracts or standing orders for excess capacity, integrating these commitments with the day-ahead bids to create a comprehensive allocation plan. This can provide a balance between stability for long-term planning and flexibility for short-term market conditions.

Upon determining the highest bidder amongst the one or more significant consumers 402, the initial bid aggregation module 506 may communicate the results to the dispatch module 510, which subsequently issues dispatch instructions 420 to the power generators 302 and significant consumers 402 to adjust their energy production or consumption accordingly. In some embodiments, the dispatch module 510 may transmit dispatch instructions to BESS 422 to either charge or discharge electrical energy 422.

Moreover, the flex platform 404, via the capacity assessment module 502, may continuously assesses the critical network points' 406 capacity usage in real-time. For example, the capacity assessment module 502 may interface with grid sensors and data acquisition systems to provide up-to-the-minute information on energy consumption and available capacity at said critical network points 406.

In one embodiment, if the capacity assessment module 502 detects remaining capacity at the critical network points 406, said module 502 may subsequently calculate the precise amount of unused capacity. As a nonlimiting example, the capacity assessment module 502 may consider various factors, including current load levels, transmission constraints, and safety margins required for grid stability.

Once the unused capacity is quantified, the flex platform 404 may leverage this information by feeding it into a dynamic auction module 508. Such a module 508 may be designed to conduct real-time auctions for the excess capacity during the second stage 514 of the bidding process 418.

The dynamic auction module 508 may initiate auctions at predefined intervals or trigger them based on specific capacity thresholds. Furthermore, the dynamic auction module 508 may broadcast auction announcements to pre-qualified significant consumers 402 through secure communication channels, utilizing the bidding interface 504 and/or dedicated APIs.

During the auction process, the module 508 may accept bids from significant consumers 402 in real-time. These bids may include parameters such as desired capacity, price per unit of energy, and duration of use. The module 508 may incorporate a clearing algorithm that considers not only the bid prices but also factors such as the impact on grid stability, the consumer's historical performance, and any relevant regulatory constraints.

For example, prior to initiation of the second stage 514 of the bidding process 418, the capacity assessment module 502 may continuously monitor the capacity consumption of the critical network points 406 to determine whether there is unused excess capacity. If the capacity assessment module 502 detects unused excess capacity, the second stage 514 may be initiated.

To illustrate, if the capacity assessment module 502 determines there's 50 MW of unused capacity at the critical network points 406, the system 400 may initiate the second stage 514 of the bidding process 418. The system 400 may subsequently determine 40 MW of capacity may be auctioned without comprising grid stability, and correspondingly auction the 40 MW via the dynamic auction module 508. Similar to the first stage 512, the one or more significant consumers 402 may submit bids for the 40 MW of unused excess capacity. The dynamic auction module 508 may compile said bids and determine the optimal allocation of capacity.

To ensure fair and efficient allocation, the dynamic auction module 508 may implement various auction formats, such as multi-unit auctions or combinatorial auctions, depending on the specific market conditions and regulatory requirements. Yet further, the dynamic auction module 508 may also include features to prevent gaming of the system 400, such as bid validation checks and anti-collusion measures.

Upon completion of each auction, the dynamic auction module 508 may communicate the results to the dispatch module 510, which then issues appropriate instructions 420 to the power generators 302 and significant consumers 402 to adjust their energy production or consumption accordingly. In some embodiments, the dispatch module 510 may transmit dispatch instructions to BESS 422 to either charge or discharge electrical energy 422. This real-time allocation of excess capacity through the second stage 514 enables the system 400 to maximize the utilization of available resources while maintaining grid stability and efficiency.

Finally, the flex platform may feature a settlement module that handles the financial transactions associated with the settlement process 426. For example, the settlement module may calculate and process payments, including flex fees 424 and fuel fees, ensuring proper remuneration to all parties involved in the system 400 (e.g., the power generators 302, the utility 308, etc.).

By implementing such a system 400, grid operators can maximize the utilization of available capacity while providing significant consumers 402 with the flexibility to adjust their energy consumption based on real-time market conditions and their operational needs.

In one embodiment, the system 400 operates within an electrical grid that may include one or more capacity constrained critical grid network elements 406. In an embodiment, said elements 406 may have a capacity.

Moreover, the system 400 may be designed to manage energy distribution between a first significant electrical energy consumer with a first peak demand and a second significant electrical energy consumer with a second peak demand. Notably, the combined peak demands of these consumers exceeds the capacity constraint of the critical grid network elements. As a nonlimiting example, the first and second significant electrical energy consumers may require at least 50 MW of electrical energy.

The system 400 may incorporate a flex platform 404 that includes a capacity assessment module 502. Such a module 502 may monitor electrical energy consumption at a specific time relative to the capacity of the critical grid network elements 406. By doing so, the capacity assessment module 502 can determine if there is any excess quantity of electrical energy remaining.

In a further embodiment, the flex platform 404 may also feature a bidding interface 504 having an initial bid aggregation module 506. As a further nonlimiting example, when excess energy is identified by the capacity assessment module 502, the flex platform 404 may allocate this energy to either the first or second significant electrical energy consumers. The allocation of excess energy may be based on bids received by the initial bid aggregation module 506.

In another embodiment, the electrical grid 300 may include one or more power generators 302. These generators 302 can be configured to allocate the excess electrical energy based on dispatch instructions 420 from the flex platform 404. Specifically, the flex platform 404 may include a dispatch module 510 that is communicatively coupled to the initial bid aggregation module 506. This dispatch module 510 may be responsible for transmitting the dispatch instructions 420 to the one or more power generators 302, the first and/or second significant electrical energy consumers, and/or the BESS 422.

Furthermore, the capacity assessment module 502 may perform multiple monitoring cycles. For instance, such a module 502 may monitor energy consumption at a second time point relative to the capacity. This allows the module 502 to determine if there is a second excess quantity of electrical energy available.

To handle situations where additional excess energy is identified, the flex platform 404 may include an auction module 508. This module 508 may be connected to both the capacity assessment module 502 and the dispatch module 510. In yet another example, the auction module 508 may receive bids for the second excess quantity of energy and work with the dispatch module 510 to allocate this energy to the appropriate consumer.

The system 400 may be flexible in how it defines the capacity of the critical grid elements. In some cases, this capacity might be a fixed value. In other embodiments, the excess may be based on an aggregated dataset. Such a dataset might include real-time readings from sensors at the critical grid network elements, historical consumption patterns of the significant consumers, and weather forecasts.

The system 400 may also be described in terms of its operational method. This method involves monitoring energy consumption, determining excess energy availability, receiving bids, and allocating the excess energy. The allocation process may involve transmitting dispatch instructions to power generators 302 and having those generators 302 allocate the energy accordingly.

The method can include multiple monitoring and allocation cycles, allowing for dynamic adjustment to changing energy availability and demand. It also incorporates an auction process for situations where additional excess energy becomes available after the initial allocation.

This system 400 and method provide a flexible and responsive approach to managing electrical energy distribution, particularly in situations where demand from significant consumers exceeds the standard capacity of the grid infrastructure.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A system for distributing electrical energy capacity at one or more capacity constrained critical grid network elements within an electrical grid to a first significant electrical energy consumer having a first peak demand and a second significant electrical energy consumer having a second peak demand wherein a combination of the first peak demand and the second peak demand exceeds an electrical energy capacity constraint of the one or more capacity constrained critical grid network elements, the system comprising:

an electrical grid comprising:
- one or more capacity constrained critical grid network elements having a capacity;

a flex platform having:
- a capacity assessment module,
  - the capacity assessment module monitors electrical energy consumption at a first time relative to the capacity of the one or more capacity constrained critical grid network elements to determine a first excess quantity of electrical energy remaining at the one or more capacity constrained critical grid network elements, and
- an initial bid aggregation module;

a first significant electrical energy consumer having a first peak electrical energy demand; and a second significant electrical energy consumer having a second peak electrical energy demand, wherein the flex platform executes a multi-stage bidding process that includes:
- a planned-bid stage wherein the first significant electrical energy consumer and the second significant electrical energy consumer each submit respective pre-planned bids specifying timeframes and quantities for excess capacity; and
- a real-time auction stage automatically triggered when the capacity assessment module detects unused capacity corresponding to the first excess quantity of electrical energy at the one or more capacity-constrained critical grid network elements, in which the flex platform receives real-time bids;

wherein the first excess quantity of electrical energy is allocated, via the flex platform, to the first significant electrical energy consumer or the second significant electrical energy consumer in response to the multi-stage bidding.

2. The system of claim 1, wherein the electrical grid further comprises:

one or more power generators or significant consumers selectively configurable to allocate the first excess of quantity of electrical energy in response to a first set of dispatch instructions transmitted from the flex platform.

3. The system of claim 2, wherein the flex platform further comprises:

a dispatch module communicatively coupled to the initial bid aggregation module that transmits the first set of dispatch instructions.

4. The system of claim 2, wherein the capacity assessment module monitors electrical energy consumption at a second time relative to the capacity of the one or more capacity constrained critical grid network elements, and wherein the capacity assessment module determines a second excess quantity of electrical energy remaining at the one or more capacity constrained critical grid network elements based on a difference between the capacity and the electrical energy consumption at the second time.

5. The system of claim 4, wherein the flex platform further comprises:

an auction module communicatively coupled to the capacity assessment module and the dispatch module,
- wherein the second excess quantity of electrical energy is allocated, via the dispatch module, to the first significant electrical energy consumer or the second significant electrical energy consumer in response to at least a second bid received by the auction module.

6. The system of claim 5, wherein the one or more power generators or significant consumers are selectively configurable to allocate the second excess of quantity of electrical energy in response to a second set of dispatch instructions transmitted from the dispatch module.

7. The system of claim 1, wherein the capacity of the one or more capacity constrained grid elements is fixed.

8. The system of claim 1, wherein the capacity of the one or more capacity constrained grid elements is based on an aggregated dataset.

9. The system of claim 8, wherein the aggregated dataset comprises:

real-time readings collected by a plurality of sensors deployed at the one or more capacity constrained critical grid network elements;

historical electrical energy consumption patterns of the first significant electrical energy consumer and the second significant electrical energy consumer; and weather forecasts.

10. The system of claim 1, wherein the initial bid aggregation module employs reinforcement learning to evaluate multiple factors simultaneously in allocating the first excess quantity of electrical energy, the multiple factors comprising one or more of:

bid prices offered by the first significant electrical energy consumer and the second significant electrical energy consumer, historical reliability and performance of the first significant electrical energy consumer and the second significant electrical energy consumer, grid stability requirements and constraints, current and projected network capacity at the one or more capacity-constrained critical grid network elements, and forecasted renewable energy generation.

11. The system of claim 1, wherein the capacity assessment module employs machine learning techniques comprising neural networks or support vector machines to identify complex patterns and relationships in historical data, and wherein the machine learning techniques are continuously refined and updated as new data becomes available.

12. The system of claim 1, wherein the flex platform further comprises a settlement module that calculates and processes payments including flex fees and fuel fees, and allocates costs and revenues among power generators, utilities, and the first significant electrical energy consumer or the second significant electrical energy consumer.

13. The system of claim 2, wherein the flex platform coordinates dispatch of the one or more power generators including baseload plants, intermediate load plants, and peaking plants to create an optimal generation mix that balances cost, reliability, and environmental considerations.

14. The system of claim 2, wherein the dispatch instructions include power output levels and operational parameters comprising ramp rates, reactive power support, and frequency response capabilities.

15. A method for distributing electrical energy capacity at one or more capacity constrained critical grid network elements within an electrical grid to at least one of a first significant electrical energy consumer having a first peak demand and a second significant electrical energy consumer having a second peak demand wherein a combination of the first peak demand and the second peak demand exceeds an electrical energy capacity constraint of the one or more capacity constrained critical grid network elements, the method comprising:

monitoring, via a capacity assessment module of a flex platform, electrical energy consumption at a first time relative to a capacity of one or more capacity constrained critical grid network elements;

determining, via the capacity assessment module, a first excess quantity of electrical energy remaining at the one or more capacity constrained critical grid network elements;

receiving, via an initial bid aggregation module of the flex platform, at least a first bid from the first significant electrical energy consumer or the second significant electrical energy consumer, wherein the flex platform executes a multi-stage bidding process that includes:

a planned-bid stage wherein the first significant electrical energy consumer and the second significant electrical energy consumer each submit respective pre-planned bids specifying timeframes and quantities for excess capacity; and a real-time auction stage automatically triggered when the capacity assessment module detects unused capacity corresponding to the first excess quantity of electrical energy at the one or more capacity-constrained critical grid network elements, in which the flex platform receives real-time bids; and allocating, via the flex platform, the first excess quantity of electrical energy to the first significant electrical energy consumer or the second significant electrical energy consumer in response to the multi-stage bidding process.

16. The method of claim 15, wherein allocating the first excess quantity of electrical energy comprises:

transmitting, from the flex platform, a first set of dispatch instructions to one or more power generators or significant consumers; and allocating, via the one or more power generators or significant consumers, the first excess quantity of electrical energy in response to the first set of dispatch instructions, wherein allocating includes evaluating multiple factors simultaneously via one or more machine learning algorithms to effectively allocate the excess quantity of electrical energy.

17. The method of claim 16, further comprising:

transmitting, via a dispatch module communicatively coupled to the initial bid aggregation module, the first set of dispatch instructions.

18. The method of claim 16, further comprising:

monitoring, via the capacity assessment module, electrical energy consumption at a second time relative to the capacity of the one or more capacity constrained critical grid network elements.

19. The method of claim 18, further comprising:

determining, via the capacity assessment module, a second excess quantity of electrical energy remaining at the one or more capacity constrained critical grid network elements based on a difference between the capacity and the electrical energy consumption at the second time.

20. The method of claim 19, further comprising:

receiving, via an auction module of the flex platform, at least a second bid from the first significant electrical energy consumer or the second significant electrical energy consumer; and allocating, via the dispatch module, the second excess quantity of electrical energy to the first significant electrical energy consumer or the second significant electrical energy consumer in response to the at least second bid received by the auction module, wherein the auction module is communicatively coupled to the capacity assessment module and the dispatch module.

21. The method of claim 20, allocating the second excess quantity of electrical energy comprises:

transmitting, from the dispatch module, a second set of dispatch instructions to the one or more power generators or significant consumers; and allocating, via the one or more power generators or significant consumers, the second excess quantity of electrical energy in response to the second set of dispatch instructions.

22. The method of claim 15, wherein the capacity of the one or more capacity constrained grid elements is fixed.

23. The method of claim 15, wherein the capacity of the one or more capacity constrained grid elements is based on an aggregated dataset, and wherein the aggregated dataset comprises:

real-time readings collected by a plurality of sensors deployed at the one or more capacity constrained critical grid network elements;

historical electrical energy consumption patterns of the first significant electrical energy consumer and the second significant electrical energy consumer;

current market prices;

system demand forecasts; and weather forecasts.

* * * * *